(12) United States Patent (10) Patent No.: US 12,661,871 B2

Jacobs (45) Date of Patent: Jun. 23, 2026

---

(54) WINDSHIELD PROTECTOR AND METHODS OF MANUFACTURING AND USING SAME

(71) Applicant: Jack Jacobs, Mt. Laurel, NJ (US)

(72) Inventor: Jack Jacobs, Mt. Laurel, NJ (US)

( * ) Notice: Subject to any disclaimer, the term of this patent is extended or adjusted under 35 U.S.C. 154(b) by 0 days.

(21) Appl. No.: 18/752,879

(22) Filed: Jun. 25, 2024

(65) Prior Publication Data

US 2024/0424765 A1 Dec. 26, 2024

Related U.S. Application Data

(60) Provisional application No. 63/510,158, filed on Jun. 26, 2023.

(51) Int. Cl.
| | |
|---|---|
| *B32B 17/10* | (2006.01) |
| *B32B 7/06* | (2019.01) |
| *B32B 27/36* | (2006.01) |
| *B32B 37/18* | (2006.01) |

(Continued)

(52) U.S. Cl.
CPC .............. *B32B 17/10* (2013.01); *B32B 7/06* (2013.01); *B32B 27/36* (2013.01); *B32B 37/182* (2013.01); *B32B 38/0004* (2013.01); *B60J 1/2094* (2013.01); *B32B 2255/26* (2013.01);

(Continued)

(58) Field of Classification Search
CPC ........... B32B 17/10; B32B 7/06; B32B 27/36; B32B 37/182; B32B 38/0004; B32B 2255/26; B32B 2307/412; B32B 2367/00; B32B 2605/00; B32B 1/00; B32B 17/10174; B32B 2307/762; B32B 2405/00; B32B 2571/00; B32B 7/12; B32B 17/10064; B32B 17/10293; B32B 17/1033; B32B 17/10798; B60J 1/2094

See application file for complete search history.

(56) References Cited

U.S. PATENT DOCUMENTS

| | | |
|---|---|---|
| 3,184,264 A | 5/1965 | Ealey et al. |
| 3,836,193 A | 9/1974 | Donahoe |
| 5,653,497 A | 8/1997 | Campfield et al. |

(Continued)

FOREIGN PATENT DOCUMENTS

| | | | | |
|---|---|---|---|---|
| KR | 101164632 B1 * | 7/2012 | ............. | B32B 17/10 |
| WO | WO-2013036017 A2 * | 3/2013 | ........... | G02F 1/1333 |
| WO | WO-2024249687 A1 * | 12/2024 | ............. | B32B 27/26 |

OTHER PUBLICATIONS

Machine translation of KR 101164632. (Year: 2012).*
Machine translation of WO2013036017. (Year: 2013).*

*Primary Examiner* — Patricia L. Nordmeyer
(74) *Attorney, Agent, or Firm* — SLEMAN & LUND LLP

(57) ABSTRACT

A windshield protective device having a notch for accommodating a radars, sensors, and RFID transponders, a protective top layer that is removable and prevents damage to the windshield protective device during transportation and installation, a clear tempered glass layer that provides strength and durability, an optical PET film that enhances the visibility and clarity of the windshield, a silicon adhesive layer that adheres the windshield protective device to the windshield without leaving any residue, and a protective backing that covers the adhesive layer until it is ready to be applied. The windshield protective device protects the windshield from scratches, cracks, chips, and other damages caused by road debris, weather conditions, or vandalism.

12 Claims, 2 Drawing Sheets

Figure 1A:
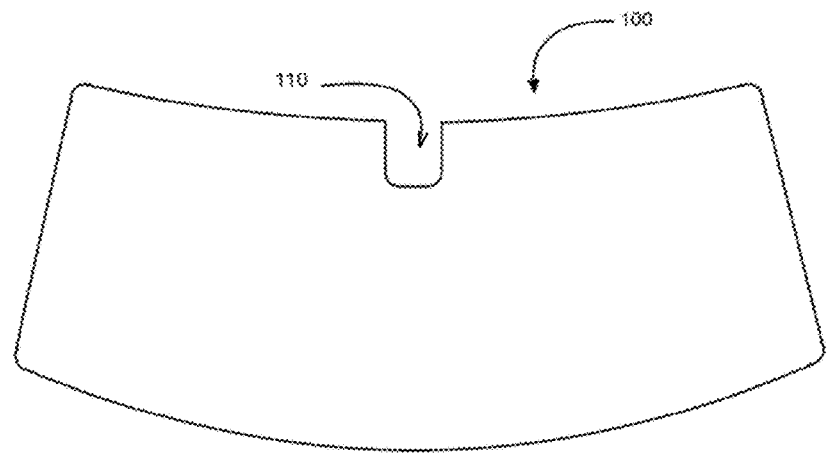

(51) Int. Cl.
  _B32B 38/00_          (2006.01)
  _B60J 1/20_          (2006.01)
(52) U.S. Cl.
  CPC ..... _B32B 2307/412_ (2013.01); _B32B 2367/00_
          (2013.01); _B32B 2605/00_ (2013.01)

(56)                    References Cited

U.S. PATENT DOCUMENTS

| | | | |
|---|---|---|---|
| 7,370,903 | B2 | 5/2008 | Barbee et al. |
| 8,486,535 | B1 | 7/2013 | Nemeth et al. |
| 2008/0252095 | A1 | 10/2008 | Meyers |
| 2017/0094039 | A1* | 3/2017 | Lu ......................... B32B 17/00 |
| 2019/0329632 | A1 | 10/2019 | Neufer |
| 2020/0231025 | A1 | 7/2020 | Andersson et al. |

* cited by examiner 120    100    130

140    150

160

100    130

140    150

WINDSHIELD PROTECTOR AND METHODS OF MANUFACTURING AND USING SAME

RELATED APPLICATIONS

The present application claims priority to U.S. Ser. No. 63/510,158, filed Jun. 26, 2023, the disclosure of which is hereby incorporated by reference in its entirety as if fully set forth herein.

FIELD OF THE DISCLOSURE

The present disclosure relates to a windshield protective device and, more particularly, a windshield protective device having one or more features for ensuring proper functioning of automotive sensors.

BACKGROUND OF THE DISCLOSURE

Modern vehicles are equipped with windshields that are susceptible to damage from debris, rocks, and environmental factors such as rain, snow, and UV radiation. This is especially the case with vehicles intended for off-road travel. Scratches, chips, or cracks on windshields can significantly impair visibility, potentially leading to accidents and endangering driver and passenger safety.

Typically, a damaged windshield is replaced or repaired. Both of these solutions can be extremely costly for modern vehicles with many technological features. Existing solutions include a protective vinyl-like film that prevents debris from scratching the surface of the windshield but fails to protect the windshield from cracks or shattering. The protective vinyl-like film does not protect from UV radiation and is likely to be affected by extreme heat. Additionally, extra layers may interfere with any signals emitted by certain technological features, which can cause faulty readings or emissions.

Therefore, there is a need for a windshield protective system that can prevent or reduce damage from various sources without compromising the functionality of the vehicle's radars, sensors, and the like.

SUMMARY OF THE DISCLOSURE

In some examples, a windshield protective device for a vehicle, includes a clear tempered glass layer, an optical PET film disposed adjacent the clear tempered glass layer, an adhesive layer applied to the optical PET film, and at least one notch formed in all of the clear tempered glass layer, the optical PET film and the adhesive layer.

BRIEF DESCRIPTION OF THE DISCLOSURE

Figure 2:
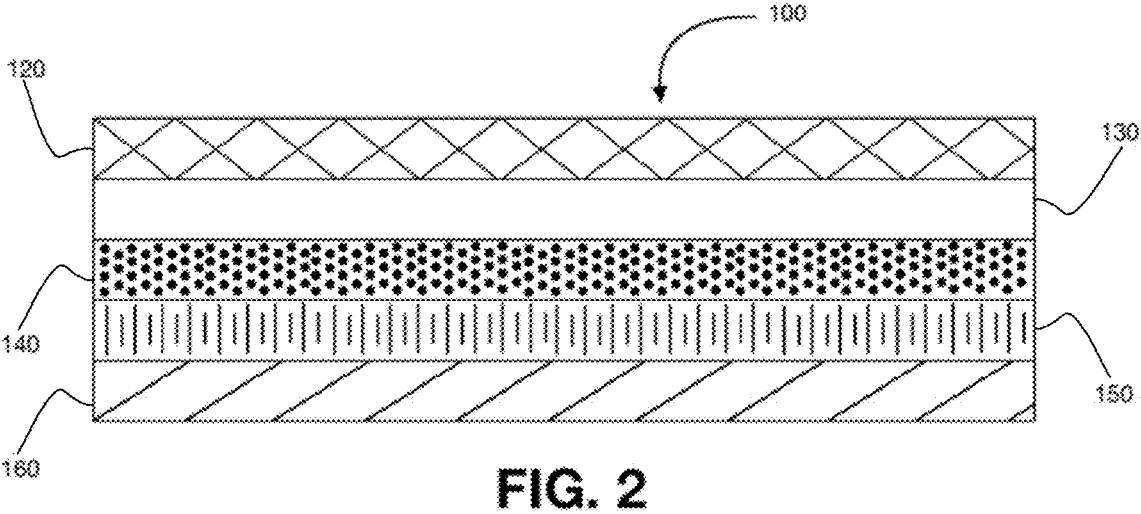
Figure 3:
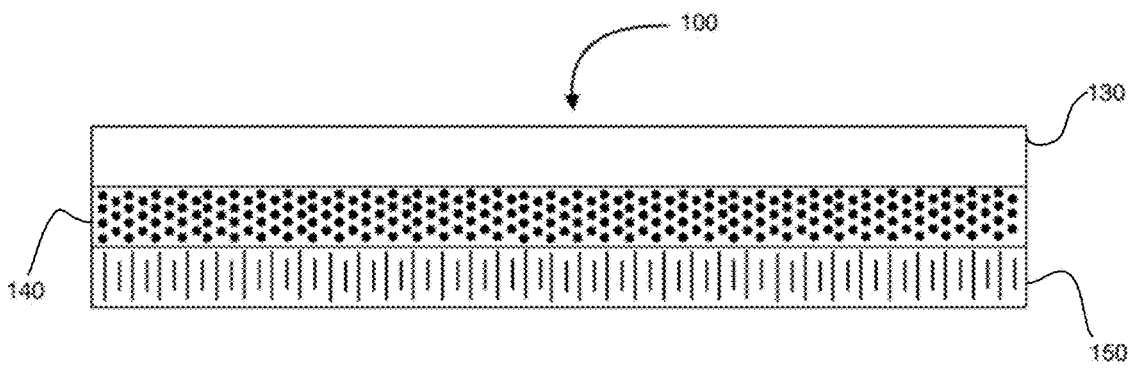

Embodiments of the presently disclosed windshield protective device are shown herein with reference to the drawings, wherein:

FIGS. 1A-D are schematic front views of a windshield protective device with notches;

FIG. 2 is a schematic cross-sectional view of a windshield protective device having several functional layers and additional protective top and bottom layers, according to an embodiment of the disclosure; and FIG. 3 is a schematic cross-sectional view of a windshield protective device according to an embodiment of the disclosure.

The embodiment of the present disclosure will now be described with reference to the appended drawings. It is to be appreciated that these drawings depict only some embodiments of the invention and are therefore not to be considered limiting of its scope.

DETAILED DESCRIPTION

Despite the various improvements that have been made to windshields and attempts to protect them, conventional devices and methods suffer from some shortcomings as described above.

There therefore is a need for further improvements to the devices, systems, and methods of protecting windshields. Among other advantages, the present disclosure may address one or more of these needs.

FIG. 1A illustrates a front view of a windshield protective device 100. Windshield protective device 100 may be formed as a geometric curved rectangle as shown, or have other shapes. In some examples, windshield protective device 100 is bespoke-that is, the device 100 is precisely custom shape, manufactured and/or cut for a particular make and/or model of vehicles. The windshield protective device 100 provides various benefits to the vehicle and its occupants. For example, the windshield protective device 100 may protect the windshield from external impact, such as rocks, debris, hail, and vandalism. The windshield protective device 100 may also protect the windshield from internal stresses, such as thermal expansion and contraction, moisture, and/or corrosion. The windshield protective device 100 may also enhance the safety and comfort of the vehicle and its occupants by reducing the risk of shattering, to sustain proper visibility, block harmful UV rays, and/or regulate the temperature inside the cabin. In at least some examples, windshield protective device 100 may be formed of multiple layers that are laminated or coupled together. Windshield protective device 100 may be substantially rigid and may cover all, or substantially all of a vehicle's windshield.

As shown in FIG. 1, an upper notch 110 is depicted, formed as a cutout that exposes the rearview mirror mounting base on the vehicle's original windshield. The rearview mirror mounting base is a device that attaches the rearview mirror to the windshield. The rearview mirror mounting base may house radars, sensors, and other electronics that are used for various functions, such as rain-sensing, adaptive cruise control, lane keeping assist, collision warning, and so on. The vehicle may also include additional features and the term "sensor" is user broadly to include parking sensors, cruise control sensors, automated or self-driving technology, cameras, toll transponders (EZ-pass), radar detectors, automatic on and off headlights, rain sensors for windshield wipers and technology yet to be developed.

Figure 1B:
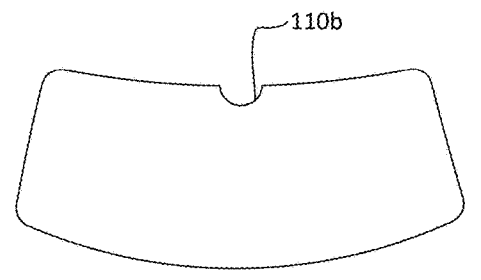
Figure 1C:
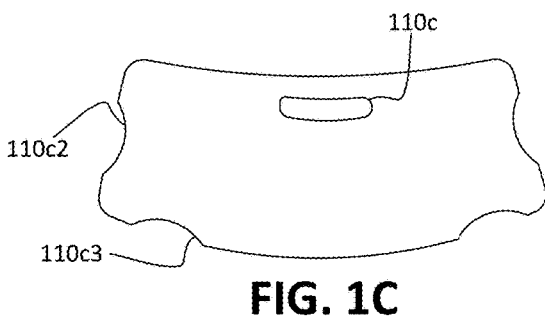
Figure 1D:
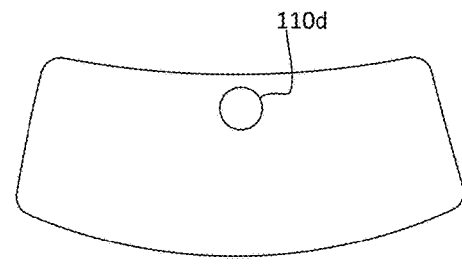

The notch 110 allows the radars and sensors to operate without interference from the windshield protective device 100. Additionally, a notch 110 prevents the windshield protective device from covering or damaging the rearview mirror mounting base. The notch 110 may have various shapes and sizes, depending on the shape and size of the rearview mirror mounting base. For example, though the notch is shown as being generally rectangular, it may be a circular or semi-circular notch 110b as shown in FIG. 1B. The notch may also be formed as a cutout completely defined within windshield protective device 100 and bounded by the materials of the protective device 100. FIG. 1C shows a curved rectangular notch 110c bounded by windshield protective device 100, and FIG. 1D shows a circular notch 110d bounded by windshield protective device 100. Rectangular, triangular, and other suitable shapes are possible. Additionally, a windshield protective device 100 may include multiple notches including side notches 110$c2$ disposed along the side edges of windshield protective device 100 and bottom notches 110$c3$ disposed along the bottom edge of windshield protective device 100. It will be understood that all of these embodiments are merely exemplary and that various combinations of the locations, sizes and/or shapes of notches may be made utilizing any of the teachings disclosed herein.

FIG. 2 is a schematic cross-sectional view of the windshield protective device 100 having several functional layers. The functional layers may include a top (or upper) layer of a removable protective film 120 used for shipping to protect the product. This layer is made of a thin plastic material that can be easily peeled off before installation. Adjacent top layer 120 is a layer of clear tempered glass 130 with fingerprint-proof coating, which may be covered by the removable protective layer 120. Tempered glass 130 may be made of a high-quality glass material that is resistant to cracking and breaking. An outer fingerprint-proof coating applied to one or both sides of tempered glass 130 may prevent smudges and stains from fingerprints and other contaminants.

Below the clear tempered glass 130 is an optical PET film 140. PET film 140 may be made of a transparent polyester material that has protective optical properties. Below the optical PET film 140, a silicone adhesive 150 is depicted, which may include a sticky silicone material that adheres the film to the windshield. Silicone adhesive 150 may be provide adequate adhesion, strength and durability. Silicone adhesive 150 may also have some flexibility and elasticity to accommodate the curvature of the windshield. It will be understood that others adhesive materials are also possible instead of silicone. A removable protective backing 160 is illustrated as the last and bottom layer. This layer is made of a paper, cardboard, or plastic material that covers the adhesive until it is ready to be applied and it serves as a barrier to prevent contaminants from affecting the silicone adhesive 150. It can be easily removed by peeling it off from one corner.

As illustrated in FIG. 3, only three of the five layers are present upon installation of the windshield protective device 100. From outside the vehicle, the clear tempered glass 130 is the exposed outermost layer and acts as the main barrier shielding the standard windshield from any impacts. The clear tempered glass 130 may also have different levels of transparency, tint, and/or reflectivity, depending on the desired optical properties. The optical PET film 140 is also present upon installation, and provides clarity, brightness, contrast, and color accuracy to the display. Finally, the third layer that remains after installation is the silicone adhesive 150 which adheres the windshield protective device 100 to a standard windshield. As a result of combining these three layers, windshield protective device 100 may have a thickness of 0.2 to 0.5 millimeters (e.g., 0.33 millimeters), which does not add any significant thickness to the windshield.

The windshield protective device 100 may be applied to the windshield using a special adhesive that bonds the film to the glass. The silicone adhesive 150 may be pressure-sensitive, heat-activated, or UV-cured. The silicone adhesive 150 may also have some self-healing properties that allow the film to recover from minor scratches and abrasions. The silicone adhesive 150 may allow for the windshield protective device 100 to be removable or replaceable, in case a layer needs to be changed or repaired.

Although the invention herein has been described with reference to particular embodiments, it is to be understood that these embodiments are merely illustrative of the prin-ciples and applications of the present invention. It is therefore to be understood that numerous modifications may be made to the illustrative embodiments, and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A windshield protective device for a vehicle, comprising:
    a clear tempered glass layer having a thickness extending in a first plane and a surface area disposed in a second plane orthogonal to the first plane, the surface area abutting and covering a windshield of the vehicle, the surface area having a perimeter defined by a curved upper edge opposing a curved lower edge, and two curved side edges that connect the curved upper edge with the curved lower edge, the curved upper edge and the opposing curved lower edge being equidistant from the windshield of the vehicle, the clear tempered glass layer forming a curved concave surface;
    an optical polyethylene terephthalate film disposed adjacent to, and in contact with, the clear tempered glass layer;
    an adhesive layer applied directly to the optical polyethylene terephthalate film; and
    at least one notch formed in all of the clear tempered glass layer, the optical polyethylene terephthalate film and the adhesive layer, the at least one notch being disposed adjacent the curved upper edge of the windshield protective device.

2. The windshield protective device of claim 1, further comprising a removable protective film disposed adjacent the clear tempered glass layer.

3. The windshield protective device of claim 2, wherein the removable protective film is made of a thin plastic material configured to be peeled off before installation.

4. The windshield protective device of claim 1, further comprising a removable protective backing disposed on the adhesive layer, configured and arranged to cover the adhesive layer until installation to prevent contamination.

5. The windshield protective device of claim 4, wherein the removable protective backing is made of a paper or plastic material or a combination thereof.

6. The windshield protective device of claim 1, further comprising a fingerprint-resistant coating on the clear tempered glass layer.

7. The windshield protective device of claim 1, wherein the adhesive layer comprises a silicone material that can be activated by pressure, heat, and/or UV light.

8. The windshield protective device of claim 1, wherein at least one notch is rectangular.

9. The windshield protective device of claim 1, wherein at least one notch is circular.

10. The windshield protective device of claim 1, wherein at least one notch comprises multiple notches.

11. The windshield protective device of claim 1, wherein at least one notch is embedded and bounded by the clear tempered glass layer.

12. A method of protecting a windshield comprising:
    measuring a windshield of a vehicle to obtain dimensions of the windshield;

storing the dimensions in association with the vehicle's make and model;

noting a position and a size of sensors on the windshield for the vehicle's make and model;

manufacturing a windshield protective device for the vehicle's make and model according the dimensions, the windshield protective device having a clear tempered glass layer, an optical PET film disposed adjacent the clear tempered glass layer, an adhesive layer applied to the optical PET film;

forming at least one notch in all of the clear tempered glass layer, the optical PET film and the adhesive layer, the at least one notch corresponding to the position and the size of the sensors for the vehicle's make and model; and coupling the windshield protective device to the windshield via the adhesive layer.

\* \* \* \* \*